(12) United States Patent
Saboune et al.

(10) Patent No.: US 10,191,552 B2
(45) Date of Patent: Jan. 29, 2019

(54) HAPTIC AUTHORING TOOL USING A HAPTIFICATION MODEL

(71) Applicant: Immersion Corporation, San Jose, CA (US)

(72) Inventors: Jamal Saboune, Montreal (CA); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/890,782

(22) Filed: Feb. 7, 2018

(65) Prior Publication Data

US 2018/0173311 A1    Jun. 21, 2018

Related U.S. Application Data

(63) Continuation of application No. 15/080,985, filed on Mar. 25, 2016, now Pat. No. 9,921,653, which is a continuation of application No. 14/282,476, filed on May 20, 2014, now Pat. No. 9,330,547.

(51) Int. Cl.
*G06F 3/01* (2006.01)
*G08B 6/00* (2006.01)

(52) U.S. Cl.
CPC .............. *G06F 3/016* (2013.01); *G08B 6/00* (2013.01)

(58) Field of Classification Search
CPC .................................. G06F 3/016; G08B 6/00
See application file for complete search history.

(56) References Cited

U.S. PATENT DOCUMENTS

| | | |
|---|---|---|
| 5,814,798 A | 9/1998 | Zancho |
| 6,650,338 B1 | 11/2003 | Kolarov et al. |
| 8,754,757 B1 | 6/2014 | Ullrich et al. |
| 2003/0068053 A1 | 4/2003 | Chu |
| 2007/0236449 A1 | 10/2007 | Lacroix et al. |
| 2009/0231276 A1 | 9/2009 | Ullrich et al. |
| 2012/0084812 A1 | 4/2012 | Thompson et al. |
| 2012/0109868 A1 | 5/2012 | Murillo et al. |
| 2013/0106691 A1 | 5/2013 | Rank |
| 2014/0108425 A1 | 4/2014 | Kamdar |
| 2014/0118125 A1 | 5/2014 | Bhatia |
| 2014/0253303 A1* | 9/2014 | Levesque ................. G08B 6/00 340/407.1 |
| 2016/0062464 A1* | 3/2016 | Moussette ................ G08B 6/00 345/173 |

FOREIGN PATENT DOCUMENTS

| | | |
|---|---|---|
| EP | 2624099 A1 | 8/2013 |
| WO | 9719398 A1 | 5/1997 |

OTHER PUBLICATIONS

Any information that are not included with this Information Disclosure Statement can be found in U.S. Appl. No. 15/080,985.
EP 15166468.7, Communication Pursuant to Article 94(3) EPC, Jun. 7, 2018, 5 pages.

* cited by examiner

*Primary Examiner* — Andrew W Bee
(74) *Attorney, Agent, or Firm* — Kilpatrick Townsend & Stockton LLP (57) ABSTRACT

A system for authoring one or more haptic effects using a haptic effect authoring tool receives a haptification model that is based on a predetermined haptic effect style. The system receives an input that includes at least one of audio and video and a plurality of events. The system then, using the haptification model, recommends a haptic effect to be associated with a corresponding event from the input.

20 Claims, 5 Drawing Sheets

HAPTIC AUTHORING TOOL USING A HAPTIFICATION MODEL

CROSS-REFERENCE TO RELATED APPLICATIONS

This application is a continuation of U.S. patent application Ser. No. 15/080,985, filed on Mar. 25, 2016 (herein incorporated by reference), which is a continuation of U.S. patent application Ser. No. 14/282,476, filed on May 20, 2014, which issued as U.S. Pat. No. 9,330,547 on May 3, 2016 the specification of which is hereby incorporated by reference.

FIELD

One embodiment is directed generally to a system, and, more particularly, to a system that recommends haptic designs.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Devices can be configured to coordinate the output of haptic effects with the output of other content, such as audio, so that the haptic effects are incorporated into the other content. For example, an audio effect developer can develop audio effects that can be output by the device, such as machine gun fire, explosions, or car crashes. Further, other types of content, such as video effects, can be developed and subsequently output by the device. A haptic effect developer can subsequently author a haptic effect for the device, and the device can be configured to output the haptic effect along with the other content. However, such a process generally requires manual input by the haptic effect developer to author a haptic effect that compliments the audio effect, or other type of content. Such a manual process can be tedious and can be time consuming.

SUMMARY

One embodiment is a system for authoring one or more haptic effects using a haptic effect authoring tool. The system receives a haptification model that is based on a predetermined haptic effect style. The system receives an input that includes at least one of audio and video and a plurality of events. The system then, using the haptification model, recommends a haptic effect to be associated with a corresponding event from the input.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a system that learns a haptification model based on a haptic effect developer's prior haptic designs and uses the learned haptification model to recommend new haptic designs for new content such as new multimedia clips.

Figure 1:
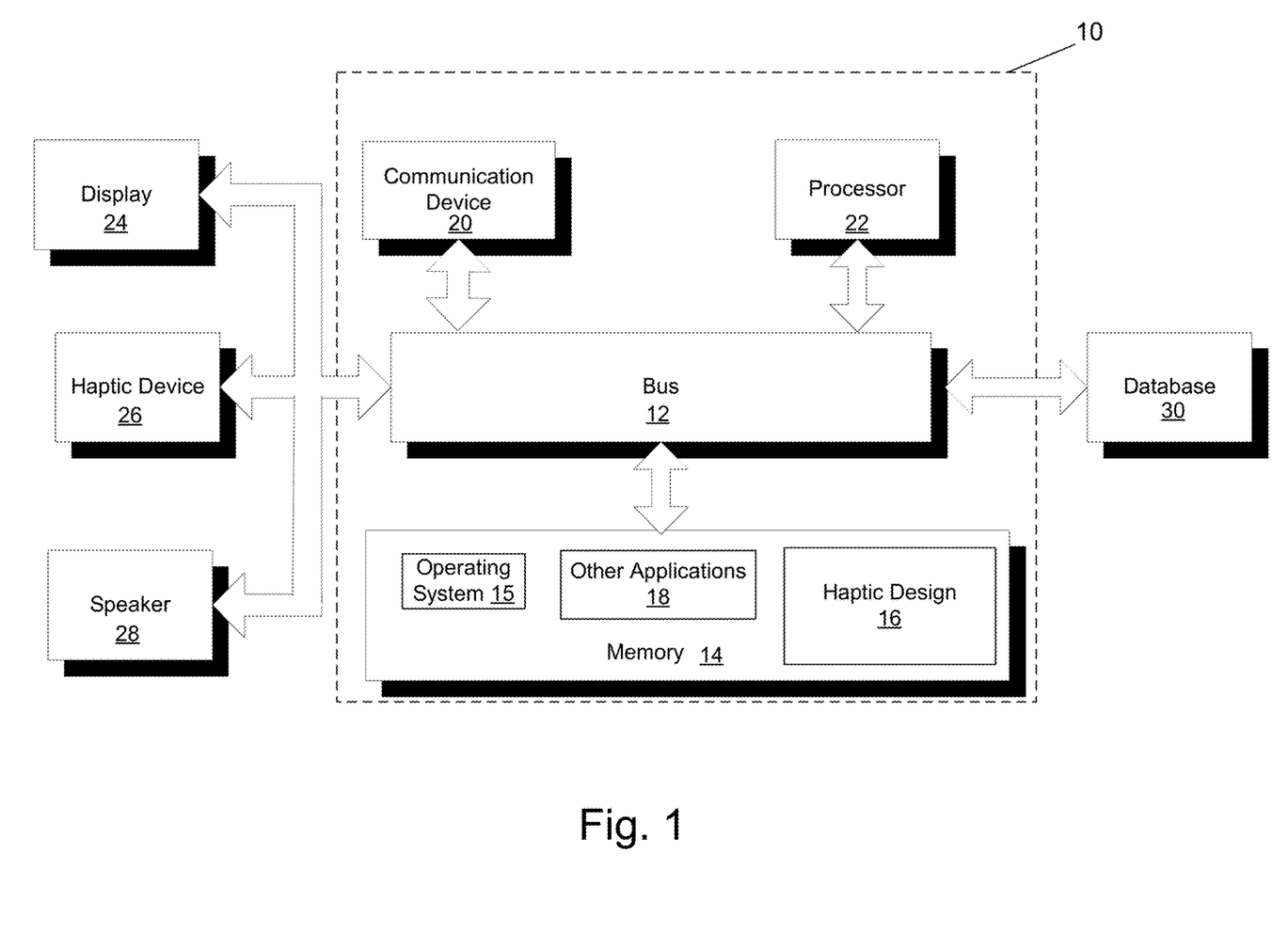
FIG. 1 illustrates a block diagram of a system in accordance with one embodiment of the invention.

FIG. 1 illustrates a block diagram of a system 10 in accordance with one embodiment of the invention. In one embodiment, system 10 is part of a haptic authoring device, and system 10 provides haptic design functionality for the haptic authoring device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a haptic authoring device in one embodiment. The modules further include a haptic design module 16 that recommends haptic designs in response to an input, as disclosed in more detail below. In certain embodiments, haptic design module 16 can comprise a plurality of modules, where each module provides specific individual functionality for recommending or generating haptic designs. System 10 will typically include one or more additional application modules 18 to include the additional functionality, such as Haptic Studio™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Actuator 26 is used for embodiments where haptic effects are generated on the same system. Otherwise, actuator 26 can be part of another device. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic signals to that device through communication device 20.

System 10, in one embodiment, further includes a speaker 28. Speaker 28 is used for embodiments where audio is generated on the same system. Otherwise, speaker 28 can be part of another device. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a database 30. Database 30 can be configured to provide storage for haptic design module 16 and store haptic design data, etc.

Figure 2:
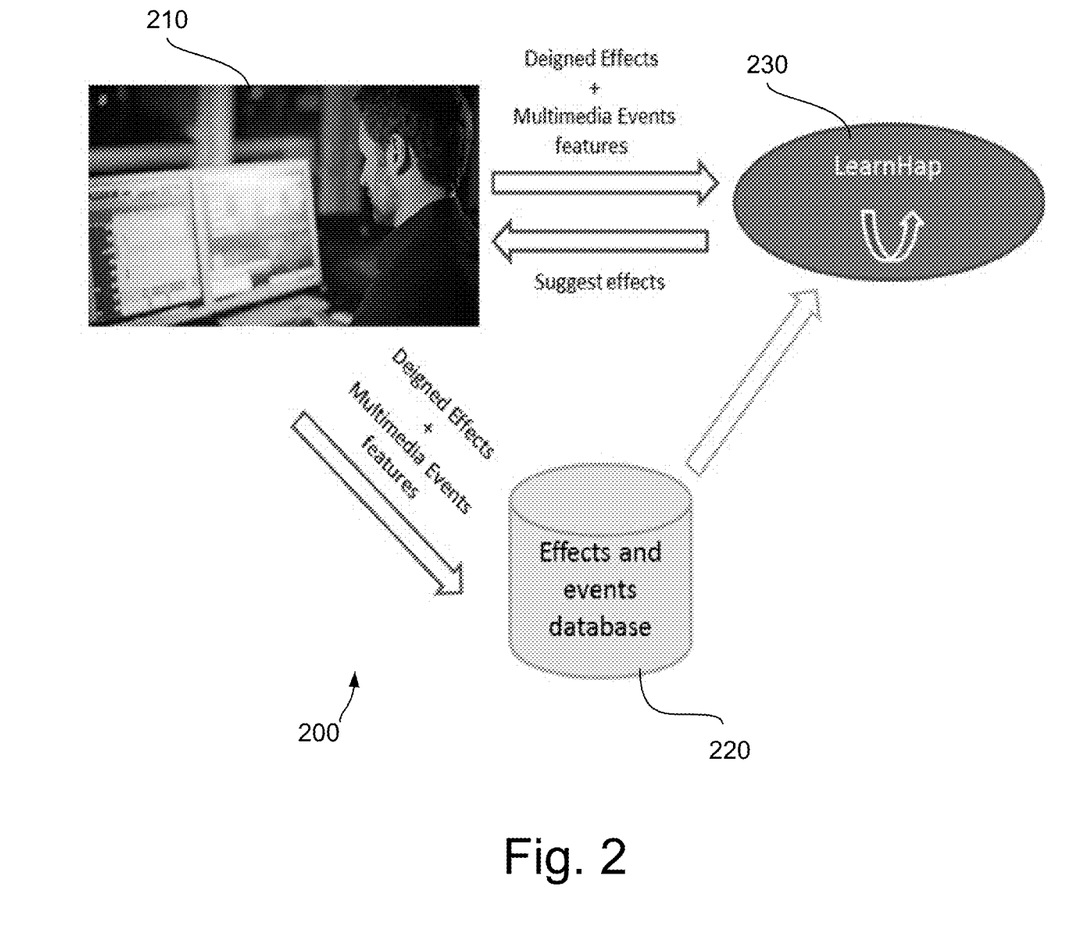
FIG. 2 illustrates a block diagram of a haptic design system in accordance with one embodiment of the invention.

FIG. 2 illustrates a block diagram of a haptic design system 200 in accordance with one embodiment of the invention. Haptic design system 200 includes a haptic authoring system 210, a database 220, and a haptic design recommender 230. Haptic design recommender 230 can be implemented using haptic design module 16 of FIG. 1.

In operation, a designer can initially operate haptic authoring system 210 to manually author a haptic effect for an event in a multimedia clip (e.g., a scene in a video or portion of audio) using, for example, haptic design software running on haptic authoring system 210. PCM signals and/or tags representing the manually authored haptic effects and features of their corresponding multimedia events can be stored in database 220 and/or transferred to haptic design recommender 230 directly. In some embodiments, database 220 can be used to construct a haptification model that can be used to generate suggested/recommended effects, as described in detail below. Haptic design recommender 230 can detect the effect's characteristics (e.g., duration, amplitude, shape, frequency, etc.) and can associate the haptic effect with features of the corresponding event in the multimedia clip occurring at the same timing (i.e., the event targeted by the haptification) according to, for example, the functionality described below in FIG. 3. In general, the high level parameters that define a particular haptic effect include magnitude, frequency, and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

In some embodiments, the features of the multimedia event can comprise audio features or/and visual features. These features can also capture the dynamics of the event (e.g., a transition between the event and the parts of the clip following or preceding it). The audio features can be spectral (e.g., frequency content, Mel-frequency Cepstral Coefficients ("MELFCCs"), power per frequency band, etc.) and temporal (e.g., shape, amplitude, timing). The visual features can include, for example, histogram of color, optical flow (e.g., motion estimation of objects in the scene), specific color pattern presence, etc. System 200 can also capture the dynamics of the scene (e.g., not only the event itself). For example, system 200 can capture if the audio amplitude is growing or reducing for the event, how the color histogram has changed throughout the event or the scene, etc.

In some embodiments, haptic design recommender 230 uses classification and clustering techniques (e.g., Hidden Markov Model ("HMM"), Gaussian Mixture Model ("GMM"), K-means, K-Nearest Neighbors ("KNN"), Bayesian Networks, etc.) to associate a type of effects with a type of events. In such embodiments, when authoring a new multimedia clip, haptic design recommender 230 can analyze the features of the new content and suggest/recommend an effect when it detects an event similar to the ones it already has learned.

In some embodiments, haptic design recommender 230 can operate in real-time, such as a background process in haptic design software running on haptic authoring system 210. In some embodiments, haptic design recommender 230 can operate off-line on previously authored content, such as by reading haptic effect data saved in "Immersion" format or formats used by D-BOX Technologies Inc. In some embodiments, haptic effect recommender 230 can be adapted to different haptic effect authors by considering only that author's previously authored effects when recommending effects for a new multimedia clip. Alternatively, in other embodiments, haptic effect recommender 230 can be configured to consider multiple authors' previously authored effects when recommending effects for a new multimedia clip.

Figure 3:
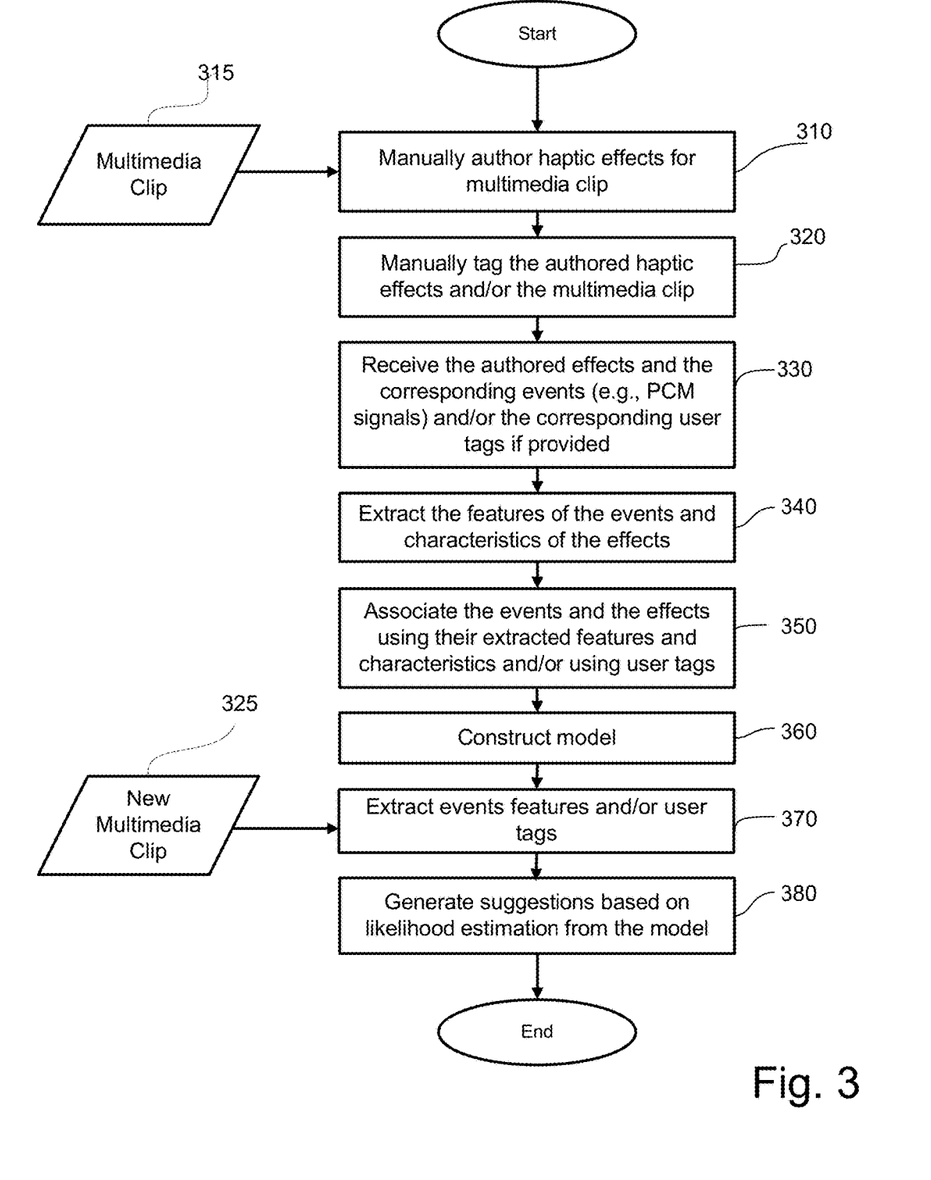
FIG. 3 illustrates a flow diagram of a haptic design module, according to an embodiment of the invention.

FIG. 3 illustrates a flow diagram of haptic design functionality performed by a system, according to an embodiment of the invention. In one embodiment, the functionality of FIG. 3 is implemented by software stored in memory or other computer-readable or tangible media, and executed by a processor. In this embodiment, each functionality may be performed by a haptic design module (such as haptic design module 16 of FIG. 1). In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

According to the embodiment, the flow begins at 310, where a user manually authors/designs haptic effects for a multimedia clip 315 using, for example, haptic design software. The effects can correspond to events in the multimedia clip. The flow proceeds to 320.

At 320, the user can tag the authored haptic effects and the events. The user can also tag the multimedia clip generally, for example, by tagging the type or genre of the multimedia clip. In some embodiments, the user is not required to tag the effects/events and the features automatically detected/extracted at 340 below are used without the manually entered tags. The flow proceeds to 330.

At 330, module 16 receives the haptic effects, events, and tags (if provided). The flow proceeds to 340.

At 340, module 16 automatically detects/extracts low level features (audio and/or video) from multimedia clip 315 and effects characteristics, from events and effects signals received at 330. For example, features describing each event (and its context as described above) can be automatically detected/extracted and then used to associate the event to characteristics describing the corresponding effect. The event features can include, for example, audio features (spectral and/or temporal) and/or visual ones (color and/or motion information). The context features can be of the same nature but less detailed as those discussed above. For example, an event can be described using its audio frequency content and/or colors histogram variation over the event and the scene/context can be described by the average audio amplitude.

In some embodiments, a combination of the two levels of descriptors (manually entered tags and automatically extracted/detected features) can be used as context information. An event/effect can be tagged by the user and at the same time its related features can be captured. In such embodiments, effects can then be suggested for new multimedia clips using a fully or semi-automatic approach for suggesting effects. The flow proceeds to 350.

At 350, module 16 associates the haptic effects with their corresponding event or succession of events and stores the associations in a database, such as database 30 of FIG. 1. The haptic effects can be associated with events using, for example, high level events/effects descriptors (e.g., semantic descriptions such as the tags manually entered at 320 and received at 330) or low level events/effects descriptors (e.g., automatically detected/extracted features such as signal features).

In embodiments where tag data is received at 330, an event tagged as "first explosion in a series" can be associated, for example, with a haptic effect tagged "strong explosion". In another example, an event tagged as "car engine" in a clip tagged as "music video" can be associated with no haptic effect while the same event in an "action video" clip can be associated to the haptic effect tagged "rumbling engine". In such embodiments, the tags are assigned by the designer manually at each event/effect design. For this specific tagging task the designer provides tagging information that allows for capturing the context of each event (e.g., name of event, scene type, preceding and following events, clip type, other events in foreground or background, etc.). In some embodiments, the tagging data assigned to each effect can be basic tags (e.g., name of effect, level of intensity). The flow proceeds to 360.

At 360, module 16 constructs (or learns) a haptification model (e.g., Bayesian models, Markovian models, etc.) using the associations of effects and events; the model being constructed to describe the designer's (user's) style. The model is used to later generate suggested/recommended effects for new multimedia clips. The model can be inclusive to capture all the information needed (event, context and effect). For example, in a Bayesian Network implementation with high level descriptors, discrete state variables can describe (one per each) the type of event, of the next or the following ones, the times to these events, the scene theme, etc.

In embodiments in which low level descriptors are used, the model can be more complex as the type of event would be expressed through the model as well. In a Bayesian Network implementation of this model, for example, the variables are continuous and each can represent one feature of one event. An example of a Bayesian Network implementation is provided in FIGS. 4 and 5 below. In some embodiments, the model is stored in the database. Alternatively, the model is constructed from data stored in the database. The flow proceeds to 370.

At 370, module 16 automatically extracts events features from a new multimedia clip 325 and/or a user (e.g., the haptic designer) tags one or more events in new multimedia clip 325.

At 380, module 16 uses the model to generate suggested/ recommended haptic effects for new multimedia clip 325 or one or more events in new multimedia clip 325. The suggestion/recommendation can be based on a likelihood estimation from the model, and can be performed in a fully automatic mode or a semi-automatic mode, depending on whether high level (tagging data) and/or low level (automatically extracted feature data) was used in construction of the model. For example, if low level data was used to construct the model at 360, then haptic effect suggestions/ recommendations can be performed in a fully automatic fashion as described below. In another example, if high level data was used to construct the model at 360, then haptic effect suggestions/recommendations can be performed in a semi-automatic fashion (e.g., by requiring the user (designer) to tag input for events in the new multimedia clip) as described below.

For example, in the semi-automatic mode, the designer/ user will have to tag the event he/she wants to haptify as well as the surrounding events and the scene, for example, to provide context information. Using machine learning algorithms, module 16 determines the most probable haptic effect given the designer's style (driven by the model) and the different states/types of the tagged events. When performing this semi-automatic mode, the database construction is preferably performed using the designer's tagging process described earlier at 320 and 330, with or without using the low level features. In this mode, for example, the designer can tag an event as an explosion followed by gunshots and tag the scene as "action." Using this information, module 16 can find the effect that best fits this configuration given the model. Because the model may not include all the possible configurations, some suggestions can be based on likelihood estimation using the model. Once the type of effect to add is detected, module 16 can use temporal features of the event to tune it accordingly (e.g., intensity, duration).

In the full automatic mode, for example, no intervention (e.g., manual input) is required from the designer. In this mode, module 16 can automatically analyze the features of the audio or video content and try to associate an effect given those features. In this mode, all the events, effects and context are described by their features and characteristics, and module 16 can look at the different features values and find the most probable set of effects characteristics using the learned model.

In some embodiments, the recommended haptic effects are used to create haptic effects for new multimedia clip 325 without user/designer interaction. For example, in such embodiments, the haptic effects recommended at 380 by module 16 are automatically applied with respect to the new multimedia clip without human interaction (e.g., no user/designer is needed to accept the recommendations). Such embodiments provide both the human touch of designer (human) authored haptic effects represented in the learned haptification model as well as the speed of automated haptic processing.

In some embodiments, the model can be dynamic, meaning that the user/designer can decline a suggested/recommended effect and propose a new effect and this new effect would be injected again to update the model.

In certain embodiments, module 16 learns a personalized evolving model (e.g., one model per designer that starts from scratch and keeps learning). In other embodiments, module 16 can use a pre-loaded generic and/or static model for multiple users (e.g., for less experienced users, or for one user to use the model of another designer such as a famous designer).

In certain embodiments, the haptic design functionality illustrated in FIG. 3 can be performed in real time (i.e., learning while the user is designing effects) or can be run on pre-designed multimedia and haptic pieces. It can also be applied to tracks created using different approaches (e.g., tracks created using Immersion Corporation's authoring tools such as Haptic Studio, tracks created for use with D-Box Technology, Inc.'s devices, etc.).

Figure 4:
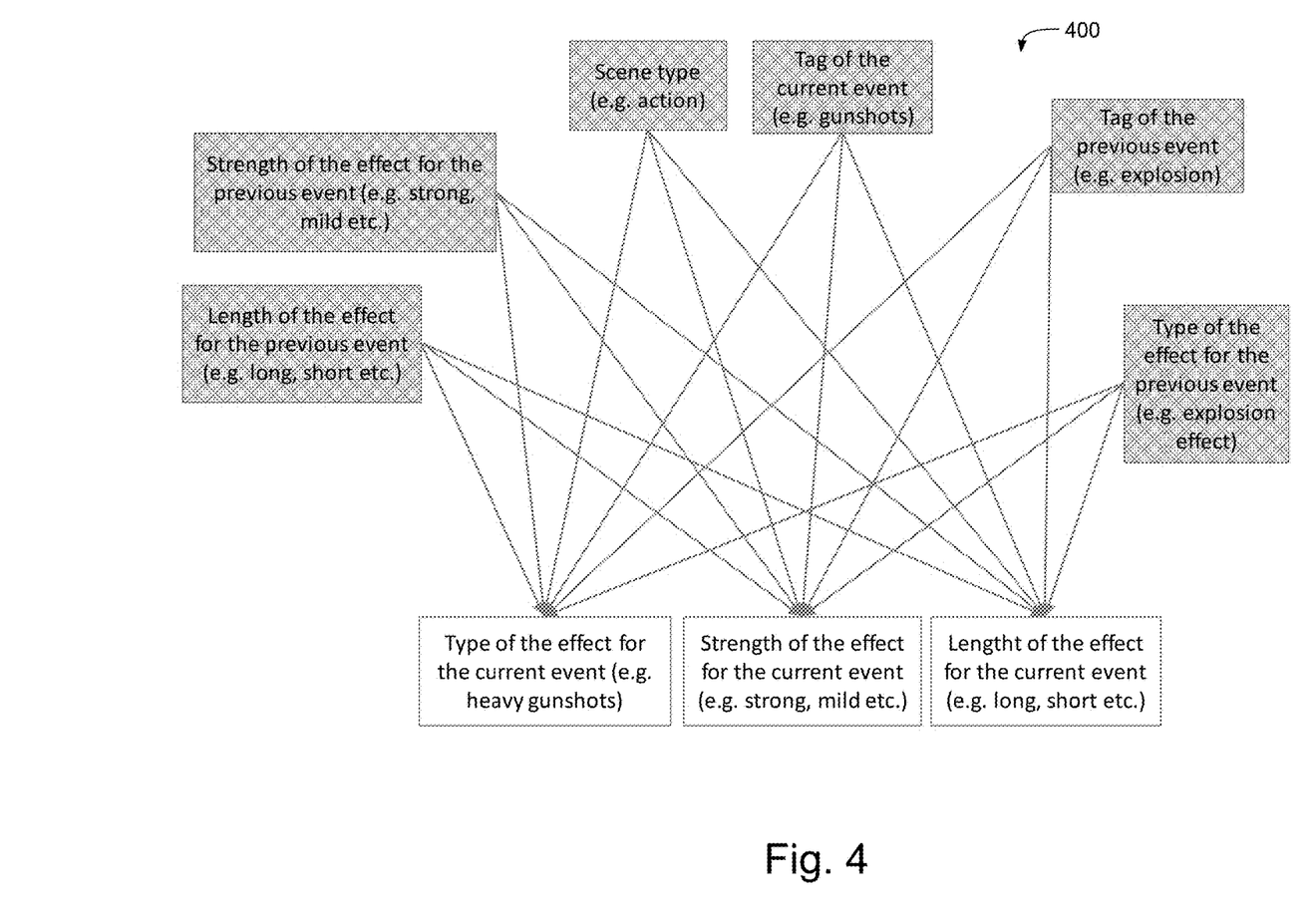
FIG. 4 illustrates a Bayesian network using high level semantic descriptors, according to an embodiment of the invention.

FIG. 4 illustrates a Bayesian network 400 using high level semantic descriptors, according to an embodiment of the invention. Bayesian network 400 with discrete variables describes a haptic effects design model where the state of the different observations (shaded nodes) affects the state of the hidden variables (plain white nodes). As used here, observations are variables with known states (estimated by module 16) while the hidden variables states are unknown and would be suggested by the model.

In embodiments utilizing Bayesian network 400, the user tags the scene type, the current event type, the previous event type and its related effect as well as the length and strength of this effect. In such embodiments, module 16 can use all this data in the model to calculate the probabilities and suggest an effect of a specific type for the current event as well as a strength level and a duration level for it. This calculation is based on the previous examples of events/effects that were fed to the model in the past.

Figure 5:
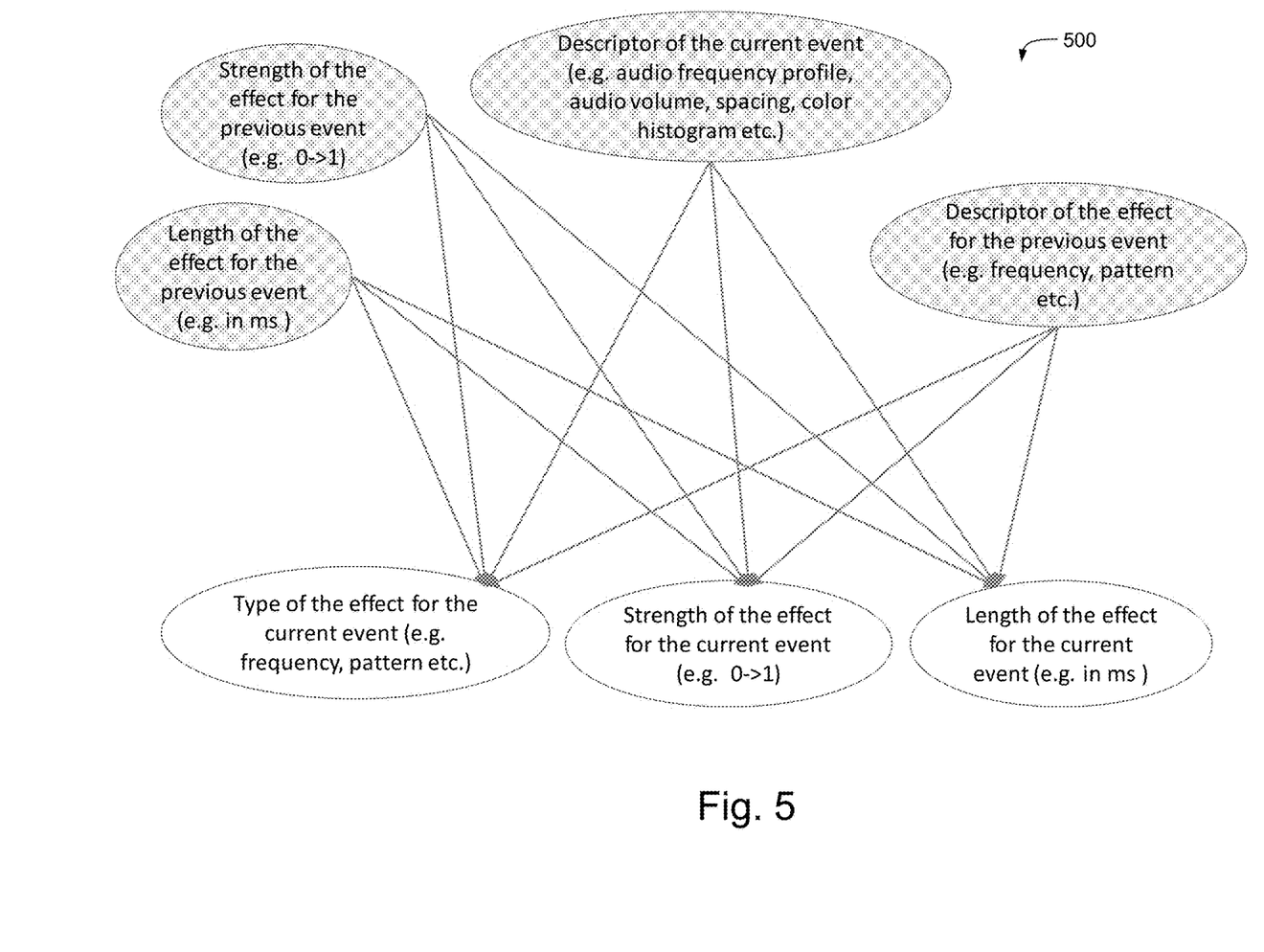
FIG. 5 illustrates a Bayesian network using low level descriptors, according to an embodiment of the invention.

FIG. 5 illustrates a Bayesian network 500 using low level descriptors, according to an embodiment of the invention. Bayesian network 500 with continuous variables describes a haptic effects design model where the state of the different observations (shaded nodes) affects the state of the hidden variables (plain white nodes). As used here, observations are variables with known states (estimated by module 16) while the hidden variables states are unknown and would be suggested by the model.

In embodiments utilizing Bayesian network 500, module 16 automatically detects/extracts the length, strength and the characteristics of the previous event's effect (e.g., frequency, pattern, shape). In such embodiments, module 16 also automatically detects the audio/visual features of the current event (e.g. audio frequency profile, color histogram change etc.). In such embodiments, module 16 can use all this data in the model to calculate the probabilities and suggest an effect for the current event (described by its strength, intensity and type).

Some known automatic haptic conversion algorithms from audio, video and/or sensory data often lack the human artistic touch. The same event in a multimedia clip can be haptified in a different way by different designers given the context of the event. In contrast, embodiments capture this human touch by associating the different designed effects to the different multimedia events taken each in its specific context (e.g., multimedia theme, type of surrounding events, etc.). Embodiments can then use this captured information to suggest effects when encountering events of the same nature. For example, in an action movie with a succession of explosions, the designer might give more importance to the first one and haptify it with an intense effect while haptifying the following ones with less intensity. However, a known automatic conversion tool will assign similar effects to similar events. In contrast, embodiments inject this context factor and artistic touch into the automatic conversion.

As disclosed, embodiments implement a haptic design authoring tool that may automatically recommend haptic effects for an input multimedia clip using a learned haptification model taking into account the artistic touch of human haptic effect designers. Thus, haptic effects can be automatically recommended without a user/designer having to manually design each haptic effect.

Several embodiments are specifically illustrated and/or described herein. However, it will be appreciated that modifications and variations of the disclosed embodiments are covered by the above teachings and within the purview of the appended claims without departing from the spirit and intended scope of the invention.

We claim:

1. A method for using a learning model, the method comprising:
   receiving associations between portions of media and haptic effects from a haptic designer; and
   constructing a learning model, according to the associations, such that the learning model uses classification and clustering techniques to determine additional associations;
   determining, according to the learning model, one or more of the haptic effects for a new portion of media; and
   rendering the new portion of media and the one or more of the haptic effects for the new portion of media.

2. The method according to claim 1, wherein the one or more of the haptic effects that is determined to be associated with the new portion of media is determined from among a plurality of haptic effects based on a probability calculation performed by the learning model.

3. The method according to claim 1, wherein the learning model is configured to determine a haptic effect for the new portion of media based on features for the new portion of media and features for a portion of media that preceded the new portion of media.

4. The method according to claim 1, wherein the media includes video and the portions of media include events in the video.

5. The method according to claim 1, wherein the learning model includes a Hidden Markov Model, a Gaussian Mixture Model, a K-means, K-Nearest Neighbors model, or a Bayesian Network model.

6. The method according to claim 1, wherein the associations that are received include associations between haptic effects and portions of media that include a plurality of features.

7. The method according to claim 6, wherein the plurality of features for a given portions of media are automatically detected and include one or more of audio frequency, colors histogram values over the given portion of media, and average audio amplitude.

8. The method according to claim 6, wherein the plurality of features include a combination of automatically detected features and features that are manually tagged by the haptic designer.

9. The method according to claim 1, wherein the learning model observes the associations that are received to determine known variable states and the known variable states are used to determine hidden variable states.

10. The method according to claim 1, wherein the learning model is further configured to determine the one or more of the haptic effects for the new portion of media that is in a style of the haptic designer.

11. A non-transitory computer readable storage medium storing one or more programs configured to be executed by a processor, the one or more programs comprising instructions for:
receiving associations between portions of media and haptic effects from a haptic designer;
constructing a learning model, according to the associations, such that the learning model uses classification and clustering techniques to determine additional associations;
determining, according to the learning model, one or more of the haptic effects for a new portion of media; and
rendering the new portion of media and the one or more of the haptic effects for the new portion of media.

12. The non-transitory computer readable storage medium according to claim 11, wherein the one or more of the haptic effects that is determined to be associated with the new portion of media is determined from among a plurality of haptic effects based on a probability calculation performed by the learning model.

13. The non-transitory computer readable storage medium according to claim 11, wherein the learning model is configured to determine a haptic effect for the new portion of media based on features for the new portion of media and features for a portion of media that preceded the new portion of media.

14. The non-transitory computer readable storage medium according to claim 11, wherein the media includes video and the portions of media include events in the video.

15. The non-transitory computer readable storage medium according to claim 11, wherein the learning model includes a Hidden Markov Model, a Gaussian Mixture Model, a K-means, K-Nearest Neighbors model, or a Bayesian Network model.

16. The non-transitory computer readable storage medium according to claim 11, wherein the associations that are received include associations between haptic effects and portions of media that include a plurality of features.

17. A device comprising:
a processor; and
a memory storing one or more programs for execution by the processor, the one or more programs including instructions for:
receiving associations between portions of media and haptic effects from a haptic designer; and
constructing a learning model, according to the associations, such that the learning model uses classification and clustering techniques to determine additional associations;
determining, according to the learning model, one or more of the haptic effects for a new portion of media; and
rendering the new portion of media and the one or more of the haptic effects for the new portion of media.

18. The device according to claim 17, wherein the one or more of the haptic effects for the new portion of media that is determined to be associated with the new portion of media is determined from among a plurality of haptic effects based on a probability calculation performed by the learning model.

19. The device according to claim 17, wherein the learning model is configured to determine a haptic effect for the new portion of media based on features for the new portion of media and features for a portion of media that preceded the new portion of media.

20. The device according to claim 17, wherein the media includes video and the portions of media include events in the video.

* * * * *